United States Patent
DeLuca et al.

(10) Patent No.: US 10,740,486 B2
(45) Date of Patent: *Aug. 11, 2020

(54) DEVICE DISPLAY SECURITY WITH USER-SPECIFIED FILTERING OF DISPLAY CONTENTS

(71) Applicant: International Business Machines Corporation, Armonk, NY (US)

(72) Inventors: Lisa Seacat DeLuca, Baltimore, MD (US); Dana L. Price, Surf City, NC (US); Aaron J. Quirk, Raleigh, NC (US); Shelbee D. Smith-Eigenbrode, Thornton, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/850,788

(22) Filed: Dec. 21, 2017

(65) Prior Publication Data

US 2018/0225478 A1    Aug. 9, 2018

Related U.S. Application Data

(63) Continuation of application No. 15/426,525, filed on Feb. 7, 2017.

(51) Int. Cl.
*G06F 21/62* (2013.01)
*G09G 5/00* (2006.01)
(Continued)

(52) U.S. Cl.
CPC ........ *G06F 21/6245* (2013.01); *G06F 3/0488* (2013.01); *G09G 3/20* (2013.01);
(Continued)

(58) Field of Classification Search
CPC .... G06F 21/6245; G06F 3/0488; G06F 3/017; G06F 3/0482; G09G 5/003; G09G 2354/00; G09G 2358/00; G09G 3/20; G09G 5/00
See application file for complete search history.

(56) References Cited

U.S. PATENT DOCUMENTS 5,801,697 A    9/1998  Parikh et al.
8,836,722 B2   9/2014  Kocjan et al.
(Continued)

OTHER PUBLICATIONS

Unknown, "My Screen Recorder 4.12: Recording a particular Area of Your Desktop Screen", http://www.deskshare.com/resources/articles/msr_DesktopRegionRecording.aspx, Dec. 12, 2015, 2 pgs.
(Continued)

*Primary Examiner* — Alexander Lagor
*Assistant Examiner* — Forrest L Carey
(74) *Attorney, Agent, or Firm* — Michael P. O'Keefe; Maxine L. Barasch; Keohane & D'Alessandro, PLLC

(57) ABSTRACT

Disclosed embodiments provide a temporary privacy mode for an electronic device. The user selects one or more regions of allowable content and/or unallowable content. The user then invokes a temporary privacy mode of the device. While the device is in the temporary privacy mode, only the allowable content is viewable on the display of the electronic device. The unallowable content is obfuscated or hidden from view. The third party therefore cannot see the content deemed private by the user. When the third party has completed review of the content, the user can exit the temporary privacy mode to return to normal operation.

14 Claims, 16 Drawing Sheets

(51) Int. Cl.
*G06F 3/0488* (2013.01)
*G09G 3/20* (2006.01)
*G06F 3/0482* (2013.01)
*G06F 3/01* (2006.01)

(52) U.S. Cl.
CPC ............... *G09G 5/00* (2013.01); *G09G 5/003* (2013.01); *G06F 3/017* (2013.01); *G06F 3/0482* (2013.01); *G09G 2354/00* (2013.01); *G09G 2358/00* (2013.01)

(56) References Cited

U.S. PATENT DOCUMENTS

| | | | |
|---|---|---|---|
| 8,867,780 | B2 | 10/2014 | Hodge et al. |
| 9,059,972 | B2 | 6/2015 | Redpath |
| 9,778,824 | B1* | 10/2017 | Bacus .................. G06F 3/0483 |
| 2003/0107584 | A1 | 6/2003 | Clapper |
| 2011/0206285 | A1 | 8/2011 | Hodge et al. |
| 2012/0127192 | A1* | 5/2012 | Cheong .................. G09G 5/14 |
| | | | 345/589 |
| 2012/0131471 | A1* | 5/2012 | Terlouw .............. G06F 3/04883 |
| | | | 715/741 |
| 2013/0135196 | A1* | 5/2013 | Park .......................... G06F 3/01 |
| | | | 345/156 |
| 2014/0094158 | A1* | 4/2014 | Maeda .................... H04W 8/22 |
| | | | 455/418 |
| 2015/0179147 | A1 | 6/2015 | Rezaiifar et al. |
| 2015/0186661 | A1 | 7/2015 | Hirase |
| 2016/0225337 | A1 | 8/2016 | Ek et al. |
| 2016/0330258 | A1* | 11/2016 | Sandhu .................. H04L 67/16 |
| 2017/0109543 | A1 | 4/2017 | Li et al. |
| 2018/0225477 | A1 | 8/2018 | DeLuca et al. |

OTHER PUBLICATIONS

Forrest L. Carey, USPTO Office Action, U.S. Appl. No. 15/426,525, dated Apr. 25, 2018, 19 pages.
Forrest L. Carey, USPTO Final Office Action, U.S. Appl. No. 15/426,525, dated Nov. 2, 2018, 23 pages.
Forrest L. Carey, USPTO Office Action, U.S. Appl. No. 15/426,525, dated Apr. 22, 2019, 18 pages.
Forrest L. Carey, USPTO Final Office Action, U.S. Appl. No. 15/426,525, dated Aug. 22, 2019, 24 pages.
Appendix P, "List of IBM Patents or Patent Applications Treated as Related", Mar. 27, 2020, 2 pages.
Carey, Forrest L., U.S. Appl. No. 15/426,525, Notice of Allowance dated Apr. 2, 2020, 18 pgs.

* cited by examiner

US 10,740,486 B2

DEVICE DISPLAY SECURITY WITH USER-SPECIFIED FILTERING OF DISPLAY CONTENTS

The present patent document is a continuation of U.S. patent application Ser. No. 15/426,525, filed Feb. 7, 2017, entitled "DEVICE DISPLAY SECURITY WITH USER-SPECIFIED FILTERING OF DISPLAY CONTENTS", the entire contents of which are incorporated herein by reference.

FIELD OF THE INVENTION

Embodiments of the invention relate generally to device display security, and more particularly, to device display security with user-specified filtering of display contents.

BACKGROUND

Electronic devices, such as smartphones, tablet computers, desktop computers, watches, and other such items, have integrated or attached display screens. Various items of content may be displayed on the screen, such as web browser pages, receipts, notifications of incoming text messages, notifications of voicemails, etc. Some portions of the content may be personal, private, or confidential in nature while other portions of the content may not. There exists a need for improvements in display device security.

SUMMARY

In one aspect, there is provided a computer-implemented method for obfuscating displayed content on an electronic device, comprising: receiving a selection of one or more regions of allowable content on a display of the electronic device; receiving a request to enter a temporary privacy mode; obfuscating an area of the display that is outside of the one or more regions of allowable content upon receiving the request to enter the temporary privacy mode; receiving a request to exit the temporary privacy mode; and deobfuscating the area of the display that was previously obfuscated.

In another aspect, there is provided an electronic device comprising: a processor; a memory coupled to the processor, the memory containing instructions, that when executed by the processor, perform the steps of: receiving a selection of one or more regions of allowable content on a display of the electronic device; receiving a request to enter a temporary privacy mode; obfuscating an area of the display that is outside of the one or more regions of allowable content upon receiving the request to enter the temporary privacy mode; receiving a request to exit the temporary privacy mode; and deobfuscating the area of the display that was previously obfuscated.

In yet another aspect, there is provided a computer program product for obfuscating displayed content on an electronic computing device, the electronic computing device comprising a computer readable storage medium having program instructions embodied therewith, the program instructions executable by a processor to cause the electronic computing device to: receive a selection of one or more regions of allowable content on a display of the electronic device; receive a request to enter a temporary privacy mode; obfuscate an area of the display that is outside of the one or more regions of allowable content upon receiving the request to enter the temporary privacy mode; receive a request to exit the temporary privacy mode; and deobfuscate the area of the display that was previously obfuscated.

BRIEF DESCRIPTION OF THE DRAWINGS

Features of the disclosed embodiments will be more readily understood from the following detailed description of the various aspects of the invention taken in conjunction with the accompanying drawings.

Figure 1:
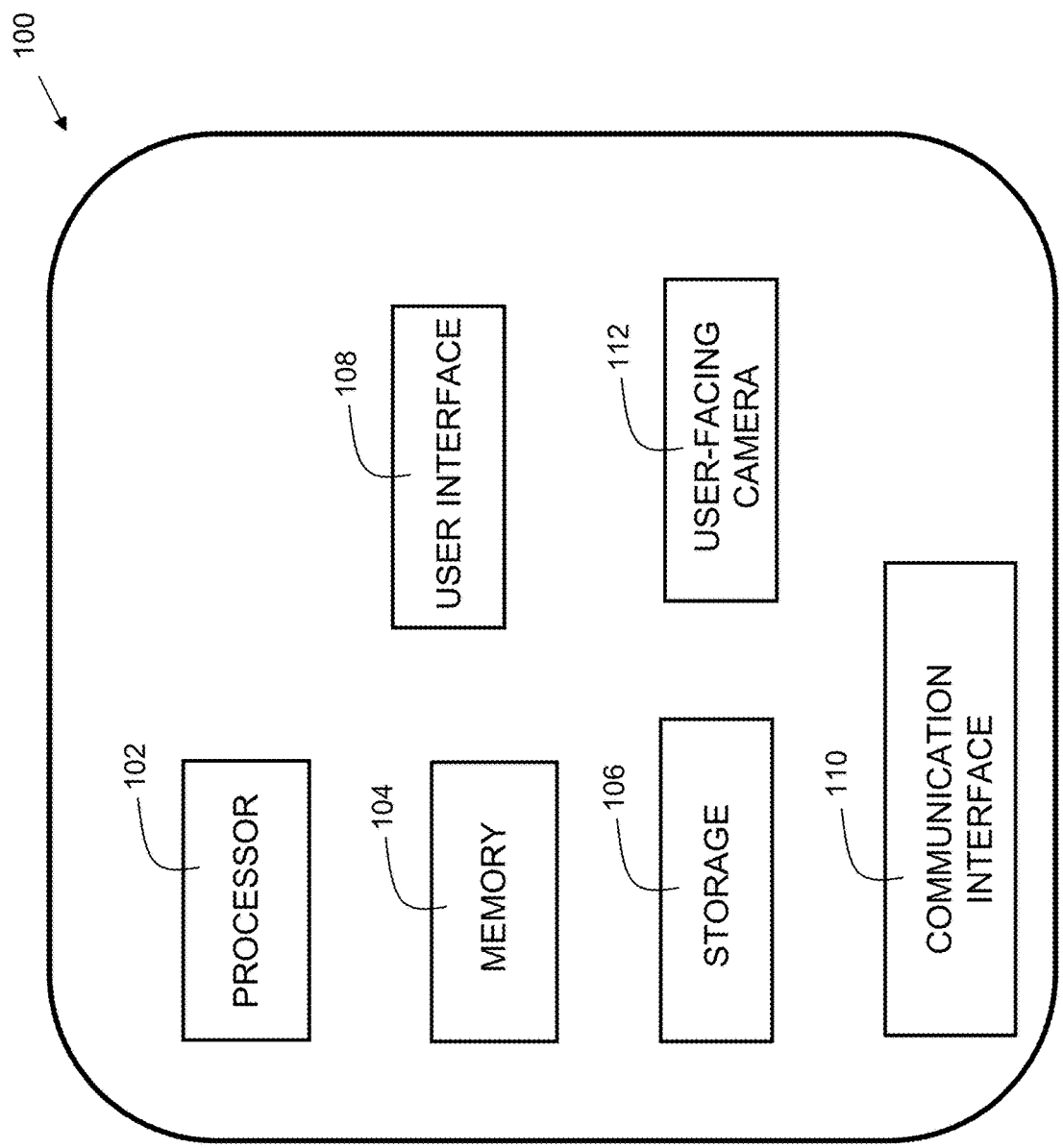
FIG. 1 is a block diagram of a device in accordance with embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

Disclosed embodiments provide a temporary privacy mode for an electronic device. The user selects one or more regions of allowable content and/or unallowable content. The user then invokes a temporary privacy mode of the device. While the device is in the temporary privacy mode, only the allowable content is viewable on the display of the electronic device. The unallowable content is obfuscated or hidden from view. The third party therefore cannot see the content deemed private by the user. When the third party has completed review of the content, the user can exit the temporary privacy mode to return to normal operation. In this way, sensitive content is better protected, reducing the risk of identity theft and other content-related crimes and issues.

On various occasions, a user may wish to show to a third party content displayed on his/her mobile device, such as a smartphone, tablet computer, or smartwatch, etc. Often, although the user wishes to share certain portions of content, there can be other portions of content that the user desires to remain private. For example, credit card information may be shown on order confirmation pages, or messages of a personal nature may come in on a text message string in an SMS notification. At times, the primary user of the device may find it desirable or necessary to show or loan the device to a third party. When a user of a device shares the device in such way, s/he may only want the third party to be able to access certain items of content without accessing others.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, integers, steps, operations, elements, components, and/or groups thereof.

FIG. 1 is a block diagram of a device in accordance with embodiments of the present invention. Device 100 is shown as a simplified diagram of modules. Device 100 is an electronic computing device. Device 100 includes a processor 102, which is coupled to a memory 104. Memory 104 may include dynamic random access memory (DRAM), static random access memory (SRAM), magnetic storage, and/or a read only memory such as flash, EEPROM, optical storage, or other suitable memory. In some embodiments, the memory 104 may not be a transitory signal per se. Memory 104 includes instructions, which when executed by the processor 102, implement steps of the present invention.

Device 100 may further include storage 106. In embodiments, storage 106 may include one or more magnetic storage devices such as hard disk drives (HDDs). Storage 106 may include one or more solid state drives (SSDs). Any other storage device may be included instead of, or in addition to, those disclosed herein.

Device 100 further includes a user interface 108. In embodiments, the device can have one or more user interfaces. The user interface 108 can include a display, examples of which include a liquid crystal display (LCD), a plasma display, a cathode ray tube (CRT) display, a light emitting diode (LED) display, an organic LED (OLED) display, or other suitable display technology. The user interface 108 may include a keyboard, mouse, and/or a touch screen, incorporating a capacitive or resistive touch screen in some embodiments.

The device 100 further includes a communication interface 110. In embodiments, the communication interface 110 may include a wireless communication interface that includes modulators, demodulators, and antennas for a variety of wireless protocols including, but not limited to, Bluetooth™, Wi-Fi, and/or cellular communication protocols for communication over a computer network.

The device 100 further includes a camera 112. Camera 112 is configured such that the lens (and flash, if applicable), face a direction of where a user would be during use of the device 100. Camera 112 can be a visual camera, IR, or other suitable image capture device.

Figure 2:
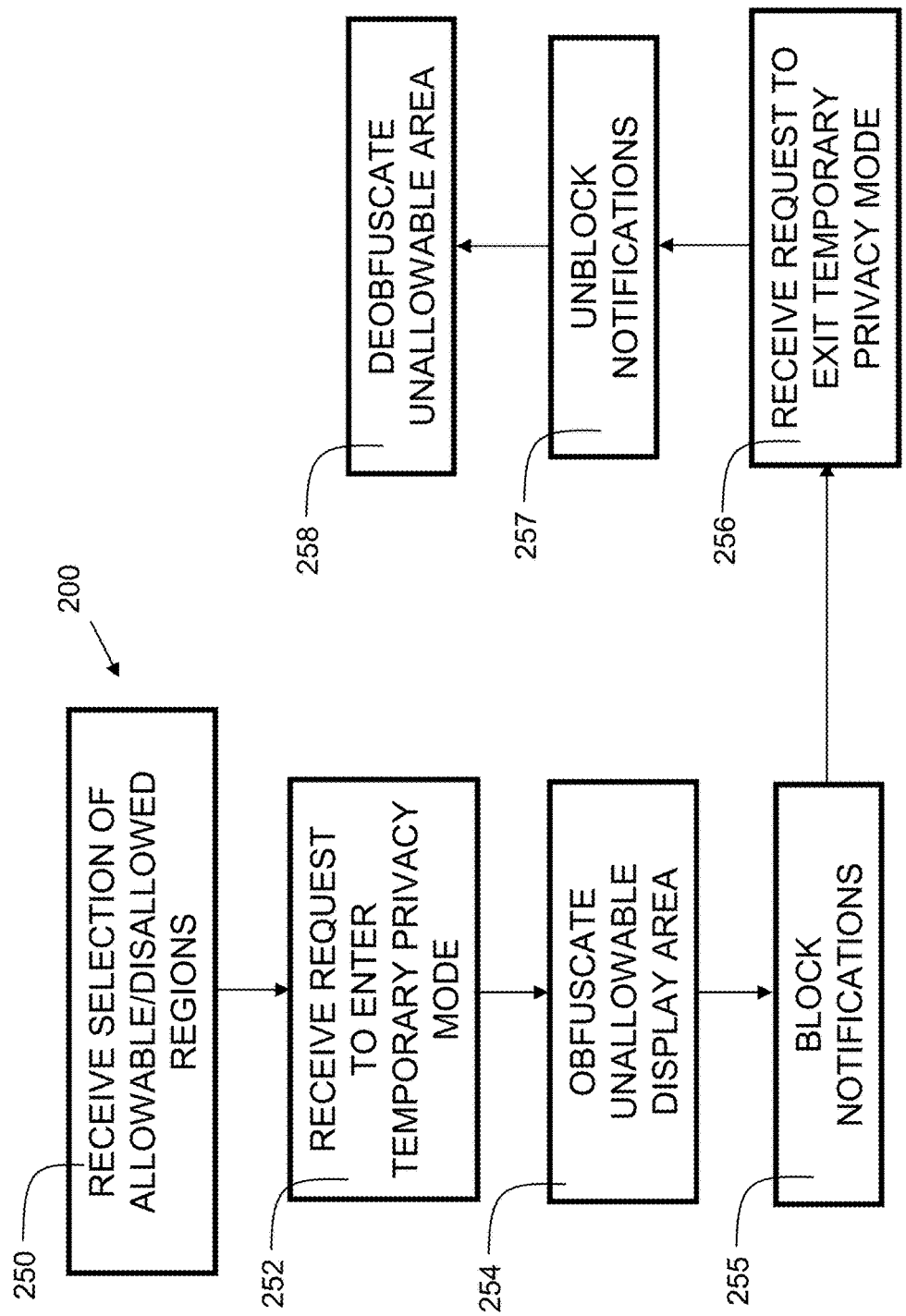
FIG. 2 is a flowchart indicating process steps for embodiments of the present invention.

FIG. 2 is a flowchart 200 indicating process steps for embodiments of the present invention. A selection of allowed or disallowed regions and/or notifications is received, at 250. A request to enter a temporary privacy mode is received, at 252. An unallowable display area is obfuscated, at 254. In some embodiments, upon entering temporary privacy mode, notifications are blocked, at 255. A request is received to exit temporary privacy mode, at 256. Upon exiting temporary privacy mode, notifications are unblocked, at 257. Unallowable area is deobfuscated, at 258, returning the device to normal operation.

Figure 3:
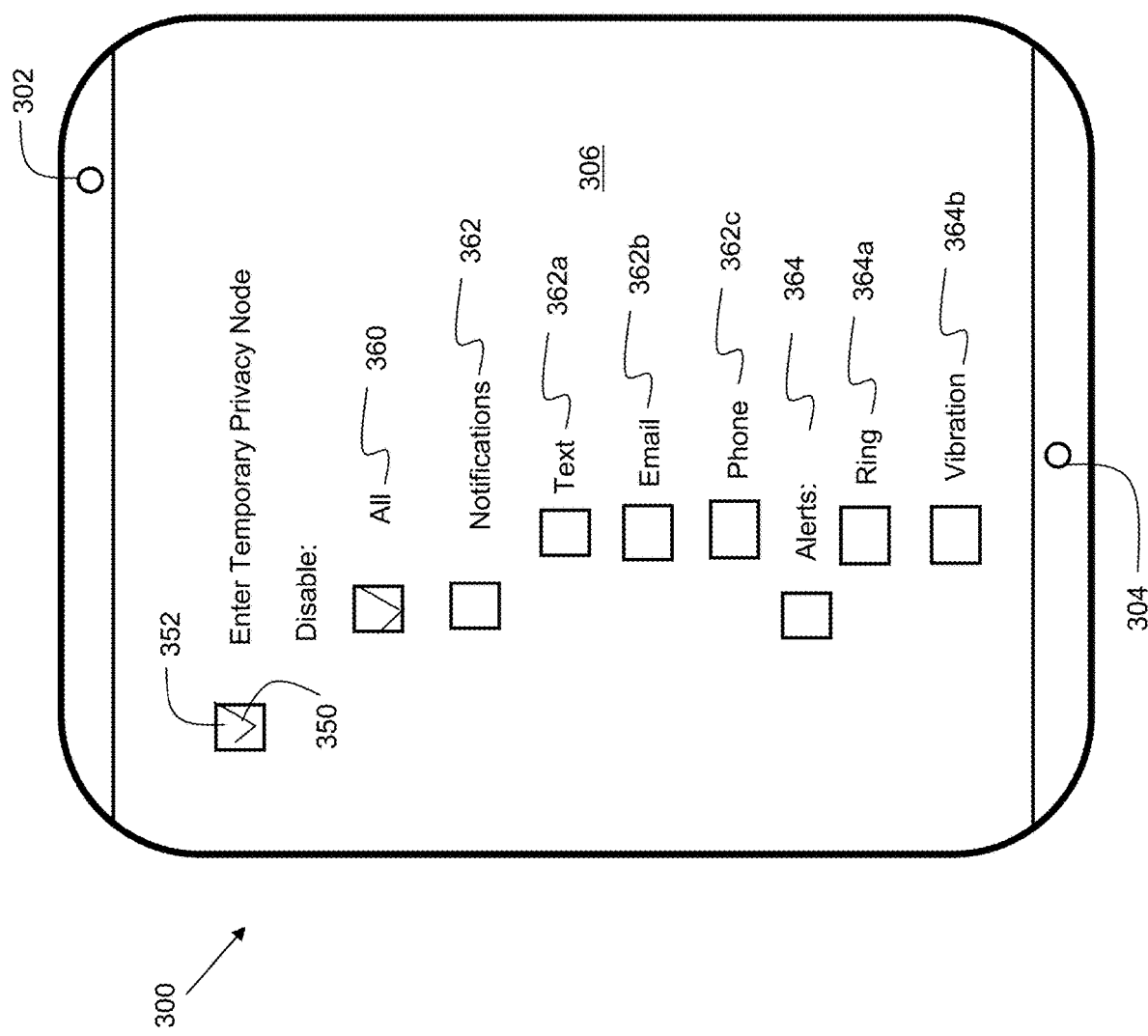
FIG. 3 shows a screen menu by which a user can set, and the device can receive, which items to disable upon entry of temporary privacy mode.

FIG. 3 shows a device 300, having displayed a menu of options on device screen 306 by which a user can set, and the device can receive, which items to disable upon entry of temporary privacy mode. In a smartphone, when a text message, email message, social media message, or other message is received, a notification may be published to the device screen. Sometimes, this notification includes at least a portion of the content of the text message. This content may be personal or confidential. In the example screen, a user may choose to enter temporary privacy mode by selecting box 352. The user may then select whether to disable "All" at 360, or only a portion, such as "Notifications" at 362 and/or "Alerts" at 364.

In some embodiments, a user may select to disable only a portion of all notifications. A user may disable one or more of such notifications by selecting among a subgroup "Notifications", for example, text (SMS) messages at 362a, emails at 362b, or voicemails at 362c. Accordingly, the user can disable all such notifications, or select from among the types (text, email, phone, etc.), in the temporary privacy mode. In some embodiments, the user can select particular phone numbers or email addresses, etc. from which notifications are to be disabled.

Embodiments may further include disabling alerts in response to receiving the request to enter the temporary privacy mode. For example, calls to a user's personal mobile device may be personal or confidential in nature. A user may not want a third party to be able to answer such calls, or to even know from what phone numbers the calls originate. The identity of a caller may be something a user does not want shared with a third party for various reasons. Accordingly, the user can disable call alerts in the temporary privacy mode. In some embodiments, all call alerts are disabled by selecting the box at 364. In some embodiments, the calls are sent directly to voicemail. In some embodiments, the user can select particular phone numbers from which calls are to be disabled, and/or sent to voicemail. The user may be able to enter phone numbers or select from their contact list to specify particular callers that are to be disabled while in temporary privacy mode. For these callers, no alert is generated on the device while in temporary privacy mode, and the calls may be sent directly to voicemail.

In some embodiments, disabling call alerts may include disabling "ring" at 364*a* or "vibrations" at 364*b* in response to receiving the request to enter the temporary privacy mode. Depending on the electronic device settings, the devices may vibrate in response to certain notifications, such as text messages, emails, or incoming calls. In some embodiments, a user may choose to disable vibration notifications. This may be in addition to, or instead of, disabling visual notifications.

In the example, the user has selected to enter temporary privacy mode, as shown by the check 350 in box 352. In such mode, "All" 360 are disabled. Accordingly, no further selections are necessary in terms of content type for disabling.

It should be recognized that in some embodiments, the menu of options may have more, fewer, or different options. In some embodiments, mechanisms other than checkboxes are used for entering preferences, such as radio buttons, drop-down menus, etc.

Figure 4:
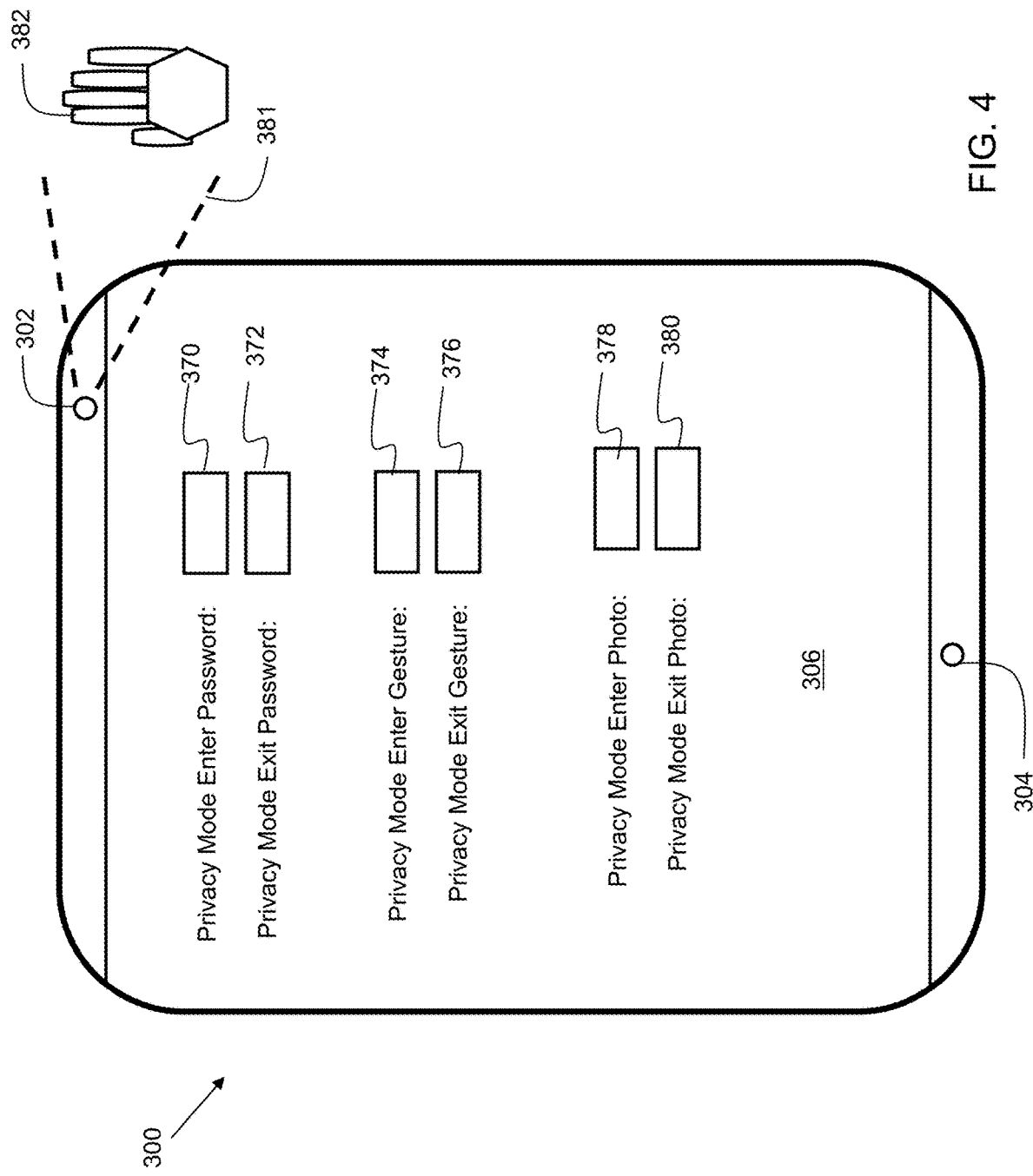
FIG. 4 shows a screen menu by which a user can set, and the device can receive, preferences as to entry and exit of temporary privacy mode.

FIG. 4 shows a device 300 having a menu of options displayed on device display 306 in which a user can set, and the device can receive, preferences as to entry and exit of temporary privacy mode. In some embodiments, a user can set (i.e. choose) to enter and exit temporary privacy mode by entering a password or other alphanumeric user input. In some embodiments, a user can set to enter and exit temporary privacy mode by facial recognition. In some embodiments, a user can set to enter and exit temporary privacy mode based on gesture recognition.

In some embodiments, a request to enter or exit the temporary privacy mode is received by user input on the touch screen. If the user device has a touch-sensitive screen, a user may enter input to the touch screen, such as a password at a user interface, for use to enter or exit the temporary privacy mode. In the example, the user can set entry and exit passwords at fields 370 and 372. In some embodiments, the passwords may be the same, and in some embodiments, the passwords may be different.

In some embodiments, a request to enter or exit the temporary privacy mode is received based on facial recognition. In the example, a user can upload an image of him/herself for the device to use in analysis and comparison during facial recognition processes. The user can upload images for facial recognition for entry and exit at fields 378 and 380, respectively. In some embodiments, the exit may be that the camera detects only the user's face in the camera field of view. In others, movements of the face can be analyzed, like direction of stare to enter or exit the temporary privacy mode.

Embodiments can include receiving a request to enter or exit the temporary privacy mode where the request includes detecting a security gesture. Gesture recognition can be conducted with techniques from computer vision and image processing. The gesture recognition may be performed using user-facing camera 302 (see also 112 of FIG. 1) on the user's device. In the example, the user can enter selected entry and exit gestures at 374 and 376. The gesture could be the same gesture as the gesture for entering the privacy mode, or can be a different one. User facing camera 302 can detect the gestures, such as hand gestures in its field of view 381, as exemplified by hand 382.

In response to the request to exit the temporary privacy mode being detected, and the user input validated, the items that were disabled, are then re-enabled on the electronic device 300.

It should be recognized that in some embodiments, the menu of options may have more, fewer, or different options. In some embodiments, mechanisms other than checkboxes are used for entering preferences, such as radio buttons, drop-down menus, etc.

Figure 5A:
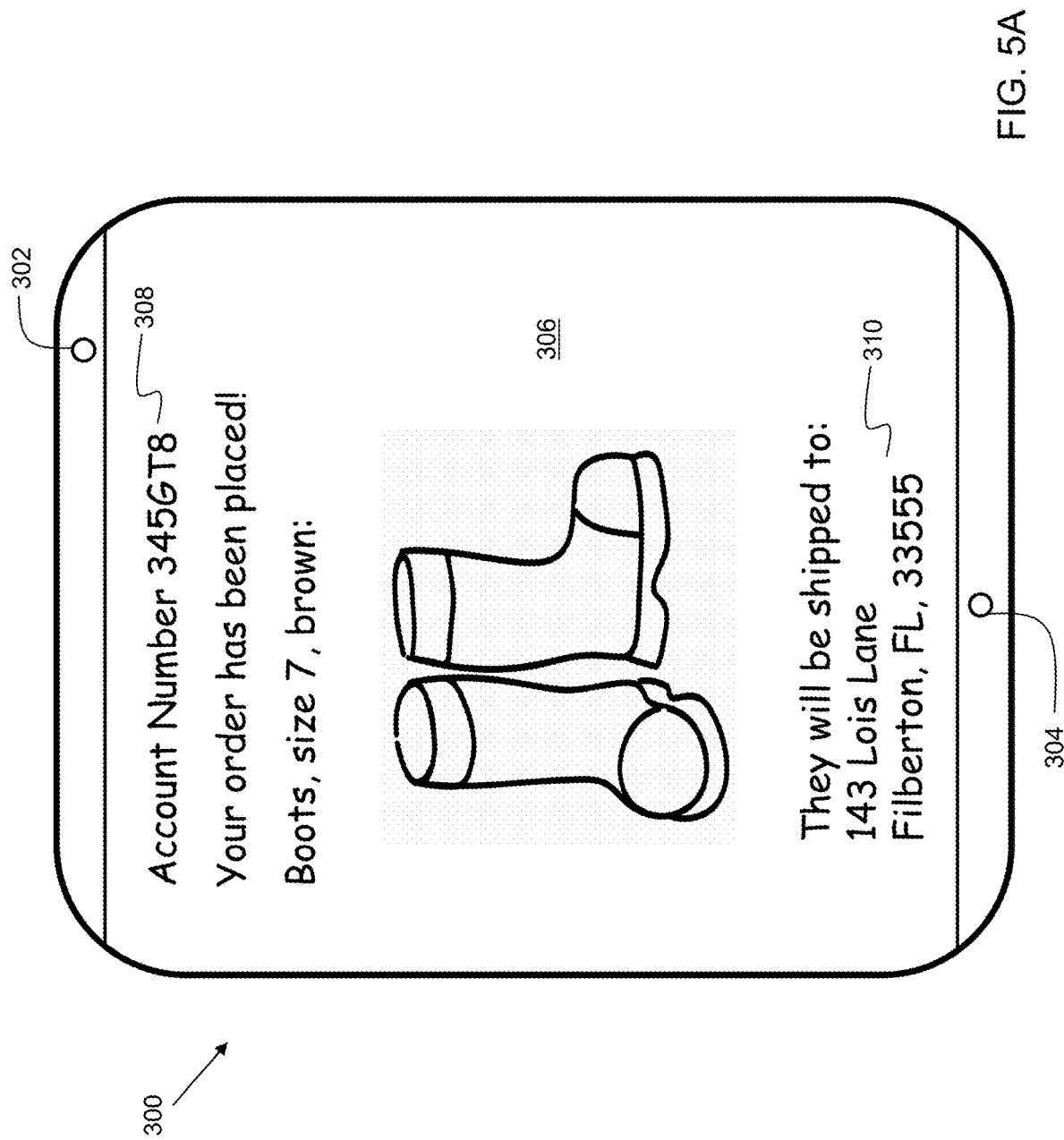
FIG. 5A shows a starting point for a use case in accordance with embodiments of the present invention.

FIG. 5A shows a starting point for an example use case in accordance with embodiments of the present invention. Device 300 includes touch-sensitive screen (touch screen) 306, as well as user interface button 304 and user facing camera 302. In the example, on the screen 306, there is shown content including an order summary webpage. The user has placed an order with a company online, and the screen is showing the relevant content, such as account number 308 and shipping content 310, which includes the user's address.

Figure 5B:
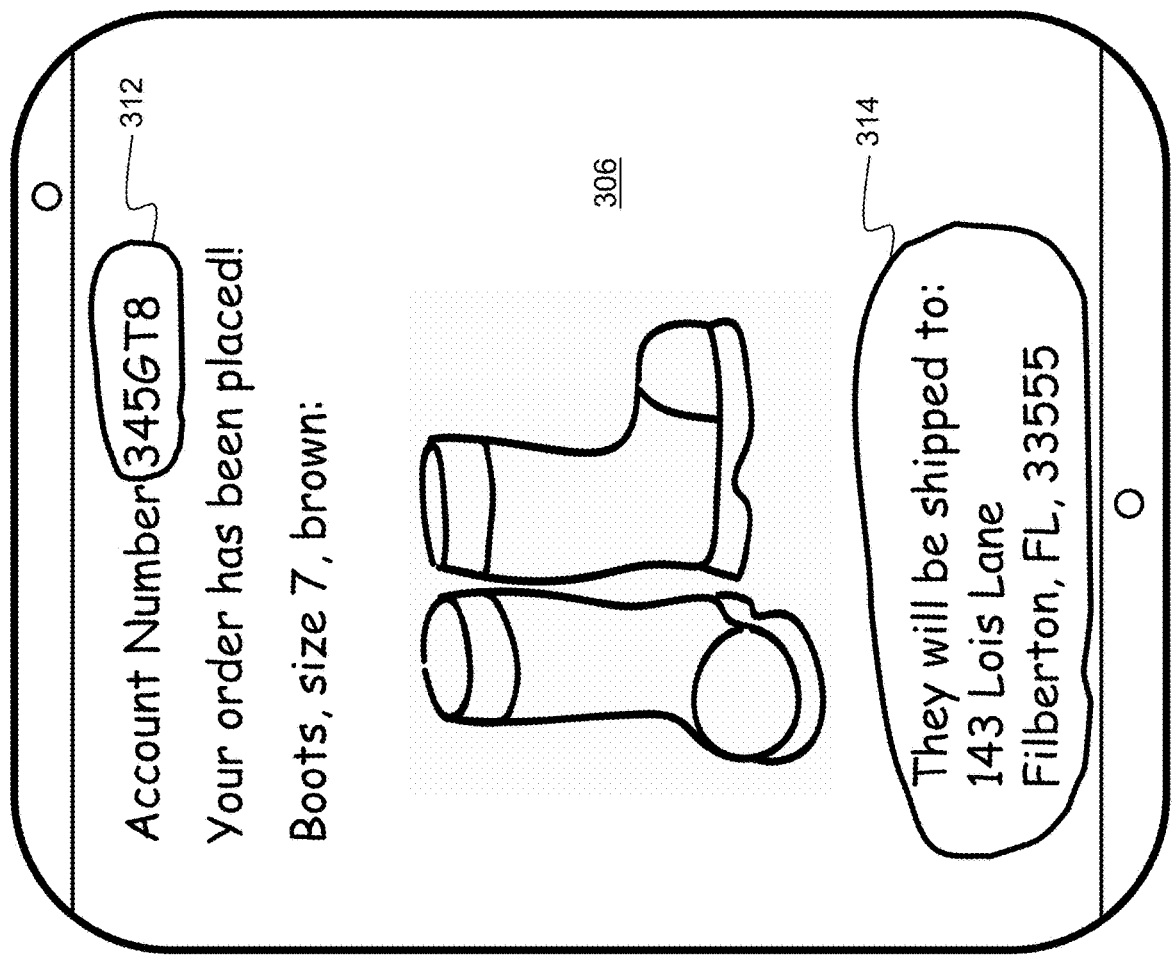
FIG. 5B shows identified regions of unallowable content.

FIG. 5B shows received regions of unallowable content. In some embodiments, receiving a selection of one or more regions of allowable content comprises receiving one or more enclosed regions of unallowable content. For example, a user may drag their finger, or other device sensed by the touch screen (i.e. a stylus), over the touch screen 306 to substantially encircle a particular area(s) of the screen which the user desires to be obfuscated. One or more regions of allowable content are then computed by excluding the one or more enclosed regions of unallowable content from the display. As shown, the user has selected as unallowable, the account number, by drawing enclosed region 312 and shipping content by drawing enclosed region 314.

Figure 5C:
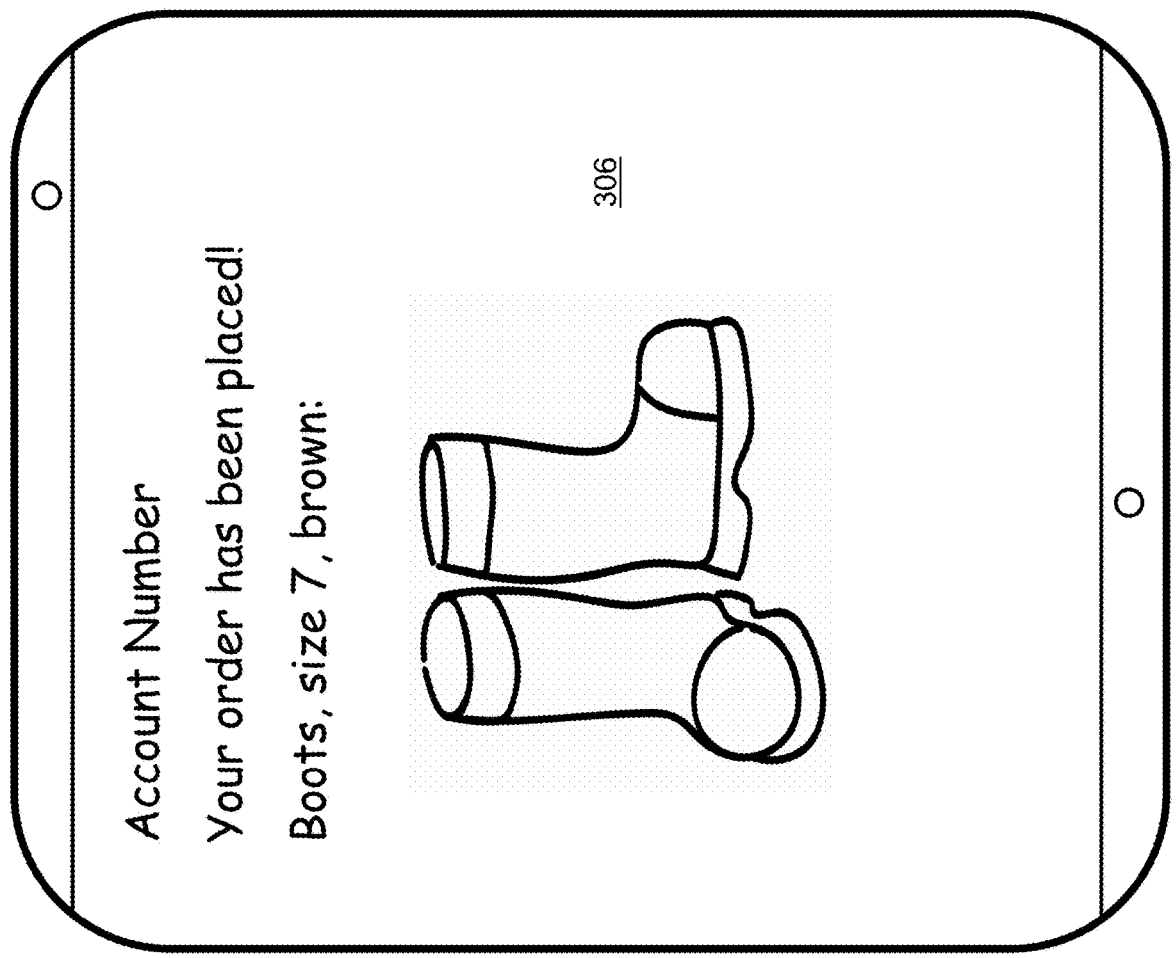
FIG. 5C shows a display in temporary privacy mode after whiting out the regions of unallowable content.

FIG. 5C shows a display, presented on screen 306 of device 300, in temporary privacy mode after obfuscating, by whiting out, the regions of unallowable content entered in FIG. 5B. In some embodiments, obfuscating an area of the display that is outside of the one or more regions of allowable content comprises whiting out the area. As shown, the enclosed regions (around the account number and shipping content) are whited out from the screen as shown in FIG. 5C as compared with FIG. 5B, so the content thereof is no longer viewable.

Figure 5D:
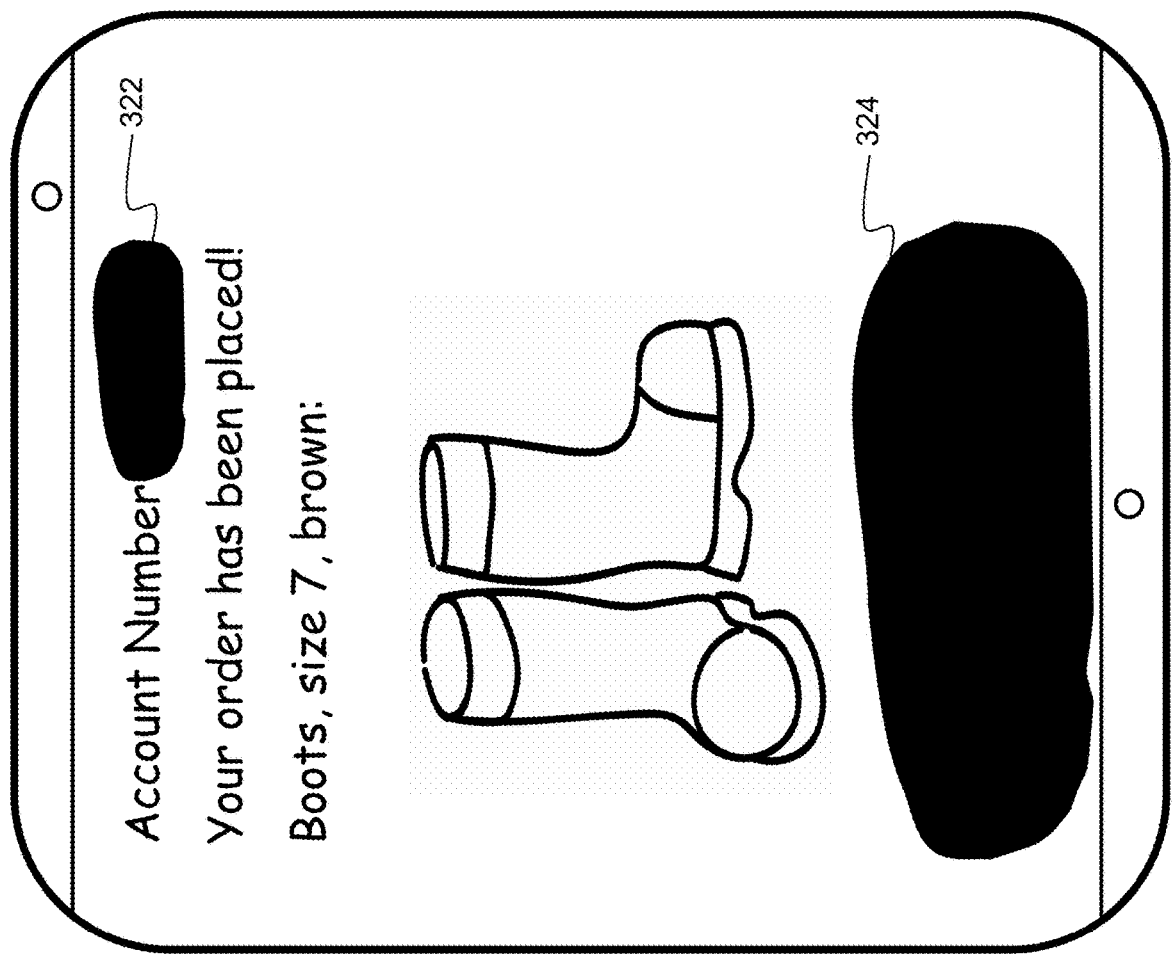
FIG. 5D shows a display in temporary privacy mode after blacking out the regions of unallowable content.

FIG. 5D shows a display, presented on screen 306 of device 300, in temporary privacy mode after obfuscating, by blacking out, the regions of unallowable content. In some embodiments, obfuscating an area of the display that is outside of the one or more regions of allowable content comprises blacking out the area. As shown, the enclosed regions (around the account number and shipping content) shown in FIG. 5B are blacked out from the screen at 322 and 324, so the content thereof is no longer viewable. In some embodiments, colors other than black may be used. In some embodiments, the color is selected by the user.

Figure 5E:
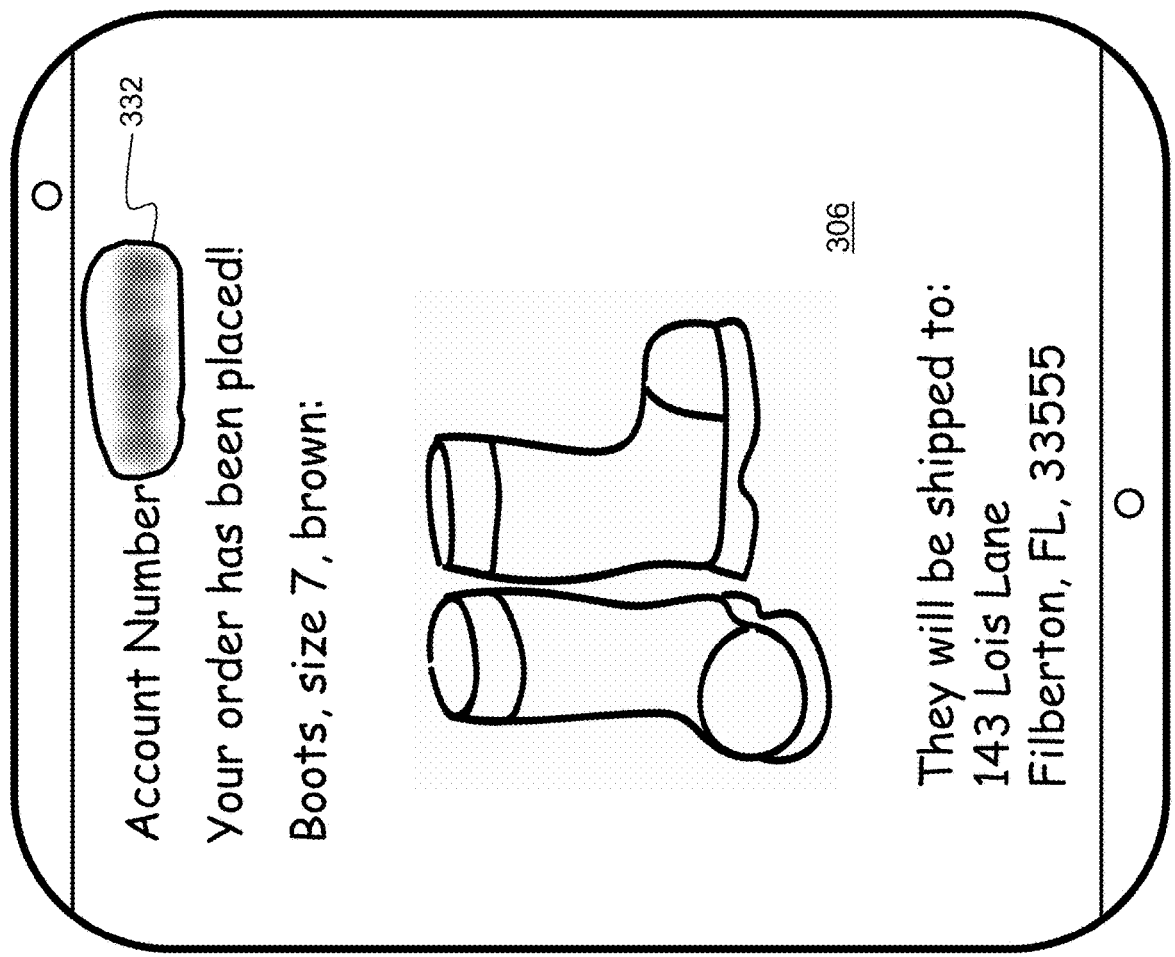
FIG. 5E shows a display in temporary privacy mode after blurring a region of unallowable content.

FIG. 5E shows a display, presented on screen 306 of device 300, in temporary privacy mode after obfuscating, by blurring, a region of unallowable content. In embodiments, obfuscating an area of the display that is outside of the one or more regions of allowable content comprises blurring the area. As shown, the enclosed region (around the account number) is blurred out from the screen at 332, so the content thereof is no longer discernable.

Figure 5F:
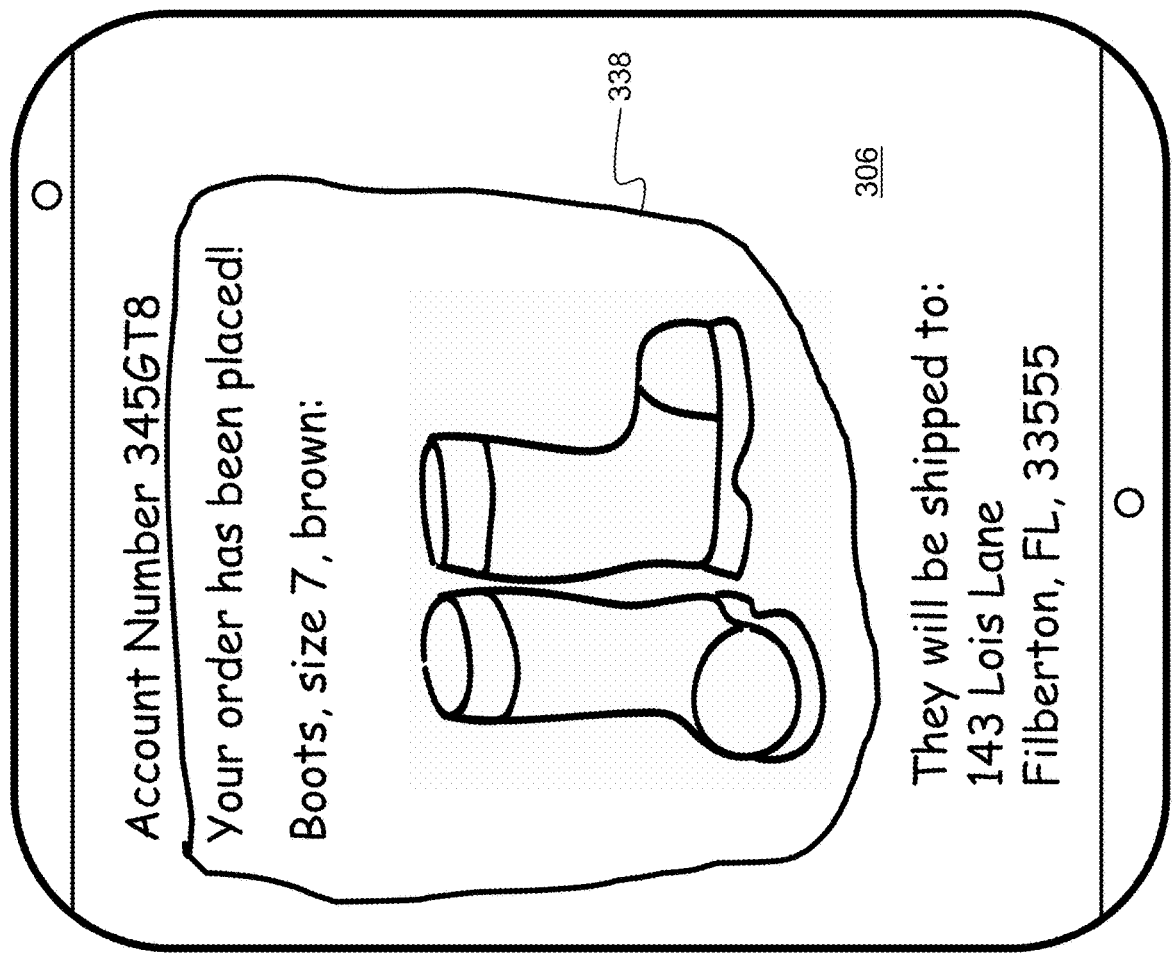
FIG. 5F shows an identified region of allowable content.

FIG. 5F shows a received region of allowable content. In some embodiments, the user selects regions of allowable content, rather than selecting regions of unallowable content. In some embodiments, receiving a selection of one or more regions of allowable content comprises receiving one or more enclosed regions of allowable content. In embodiments, receiving a selection of one or more regions of allowable content comprises tracking a closed shaped path from user input of a touch screen on the electronic device. In the example, a user has dragged his/her finger, or other device, over the screen to create a closed path 338 around content that the user deems allowable.

Figure 5G:
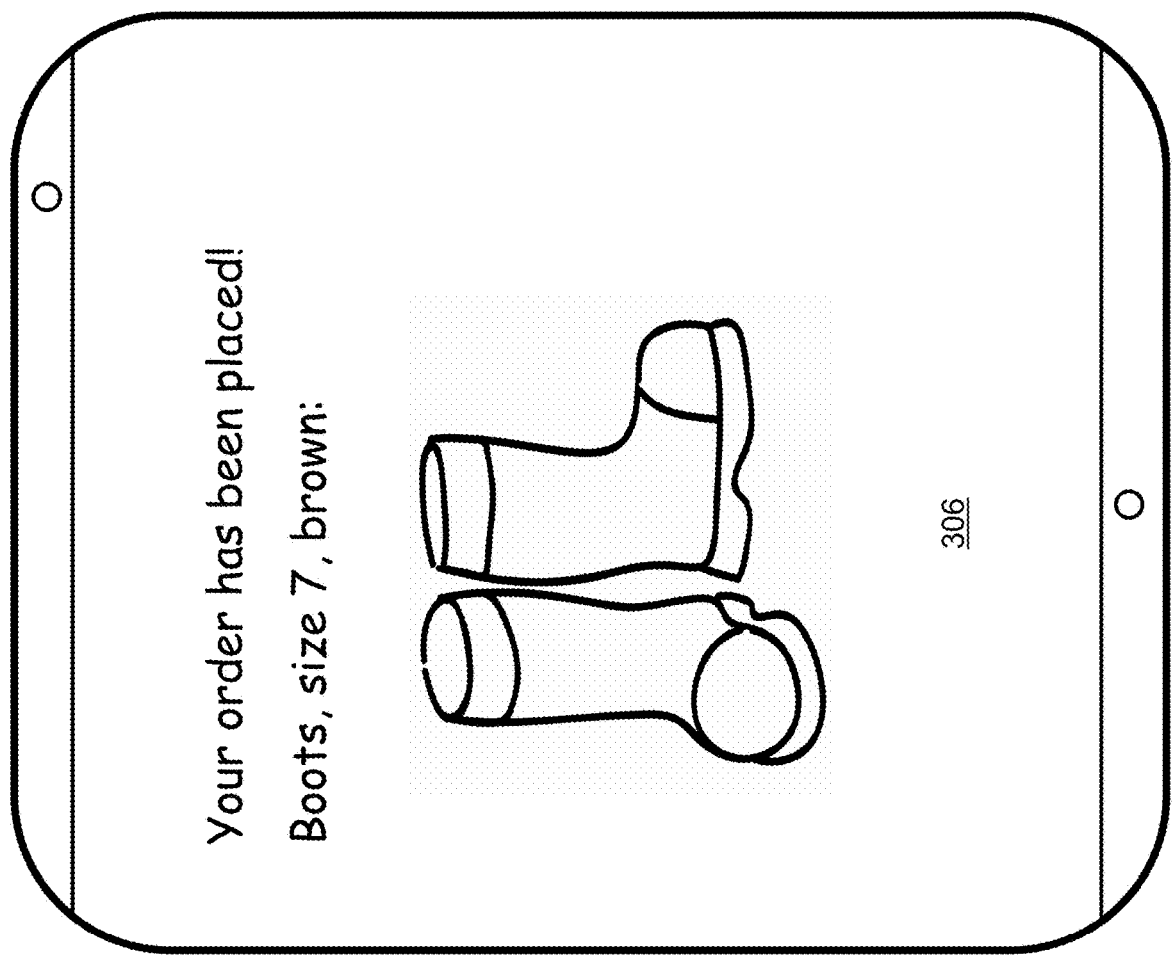
FIG. 5G shows a display in temporary privacy mode after whiting out the display outside of the identified region of allowable content.

FIG. 5G shows a display, presented on screen 306 of device 300, in temporary privacy mode after obfuscating, by whiting out, the display outside of the received region of allowable content. The areas of the screen 308 and 310 (of FIG. 5A) outside of the region formed by the interior of closed path 338 (of FIG. 5F) is whited out, and no longer displayed.

Figure 5H:
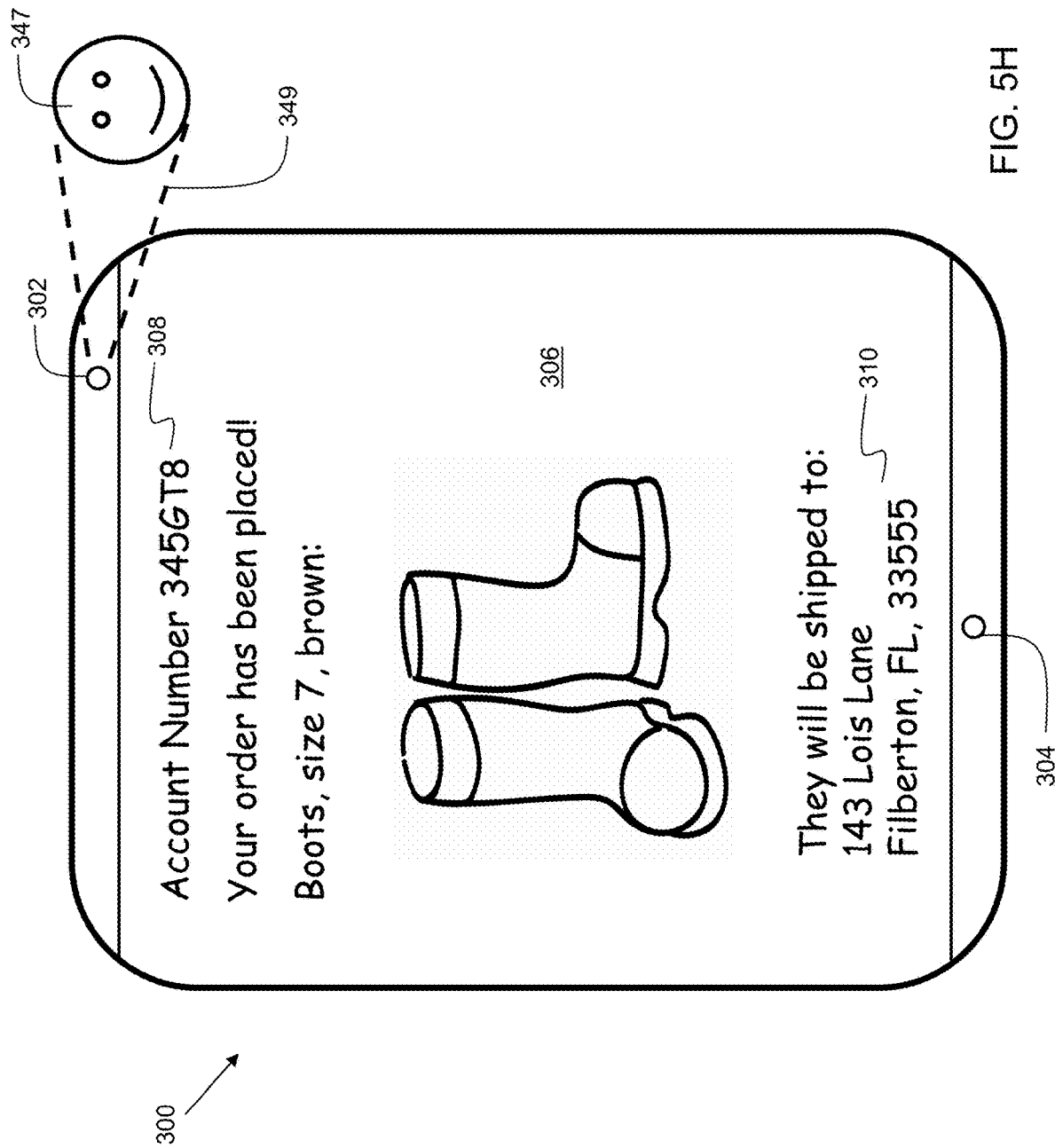
FIG. 5H shows a device upon exit of temporary privacy mode based on facial recognition.

FIG. 5H shows a device upon exit of temporary privacy mode based on facial recognition. In some embodiments, receiving a request to exit the temporary privacy mode includes performing a facial recognition process on one or more images obtained from a user-facing camera of the device. The temporary privacy mode is exited upon detecting a condition of a solitary face that is associated with the electronic device. A user can associate a photo of him/herself as the administrative user of the electronic device. In the example, when the user-facing camera 302 detects that administrative user's face 347 as the sole face in the camera field of view 349, the temporary privacy mode is exited in response.

Figure 6A:
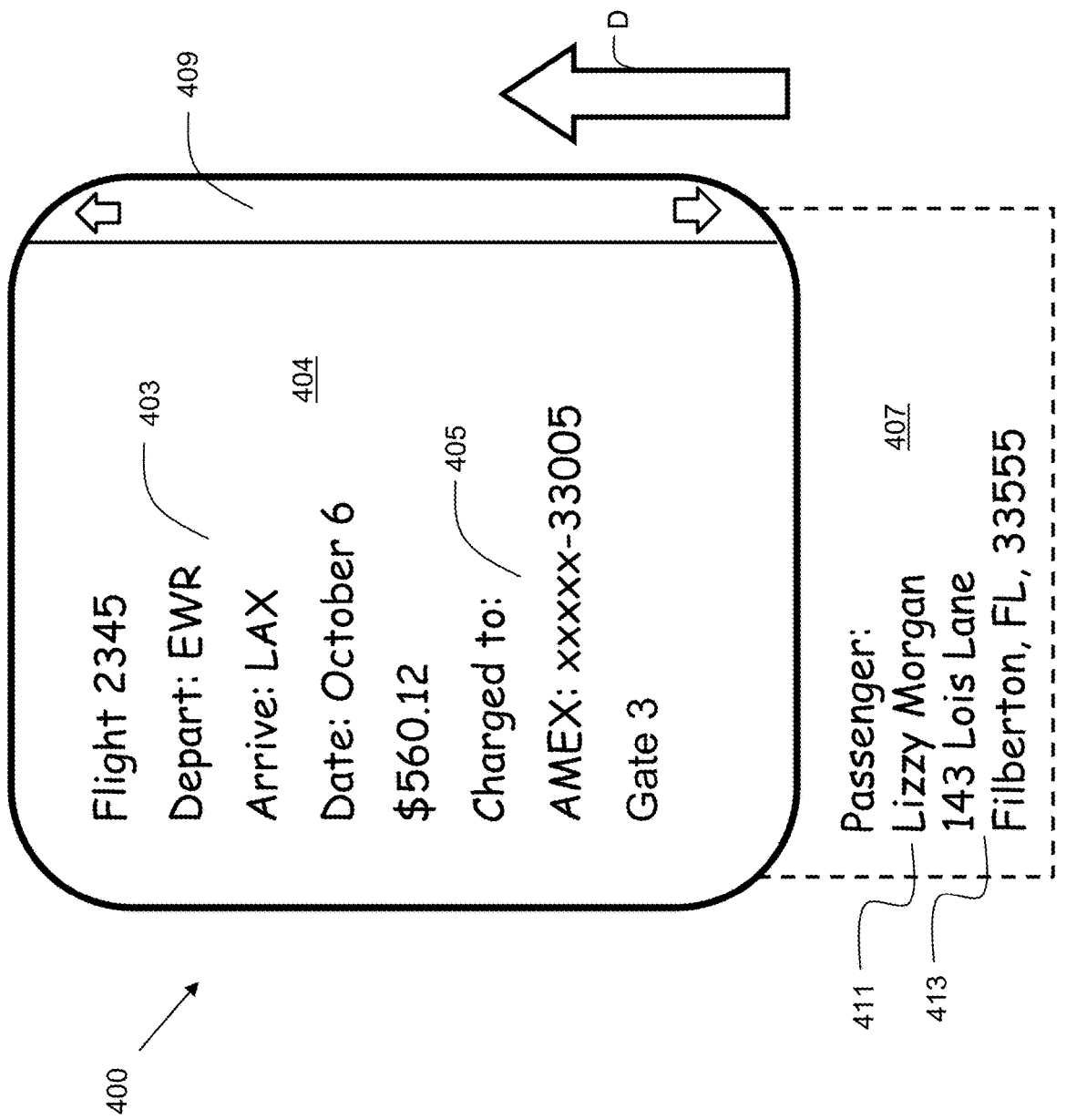
FIG. 6A shows a starting point for another use case in accordance with embodiments of the present invention in which the available data of the "page area" exceeds the display extents.

FIG. 6A shows a starting point for another use case in accordance with embodiments of the present invention in which available data on a page exceeds the screen extents. Screen 404 of an electronic device 400 shows a receipt including content about a recent purchase of an airline ticket. Relevant content included on the display receipt is airport and date content 403, charge card information 405, and passenger content 407 which includes passenger name 411 and passenger address 413. As shown, the available data exceeds the screen space of display screen 404, so passenger content 407 is an area not shown. The user could scroll down using scroll function 409 on the screen 404 to view such content. Alternatively, in a touch screen embodiment, the user may swipe the display up in the direction indicated by arrow D in order to view the content 407.

Figure 6B:
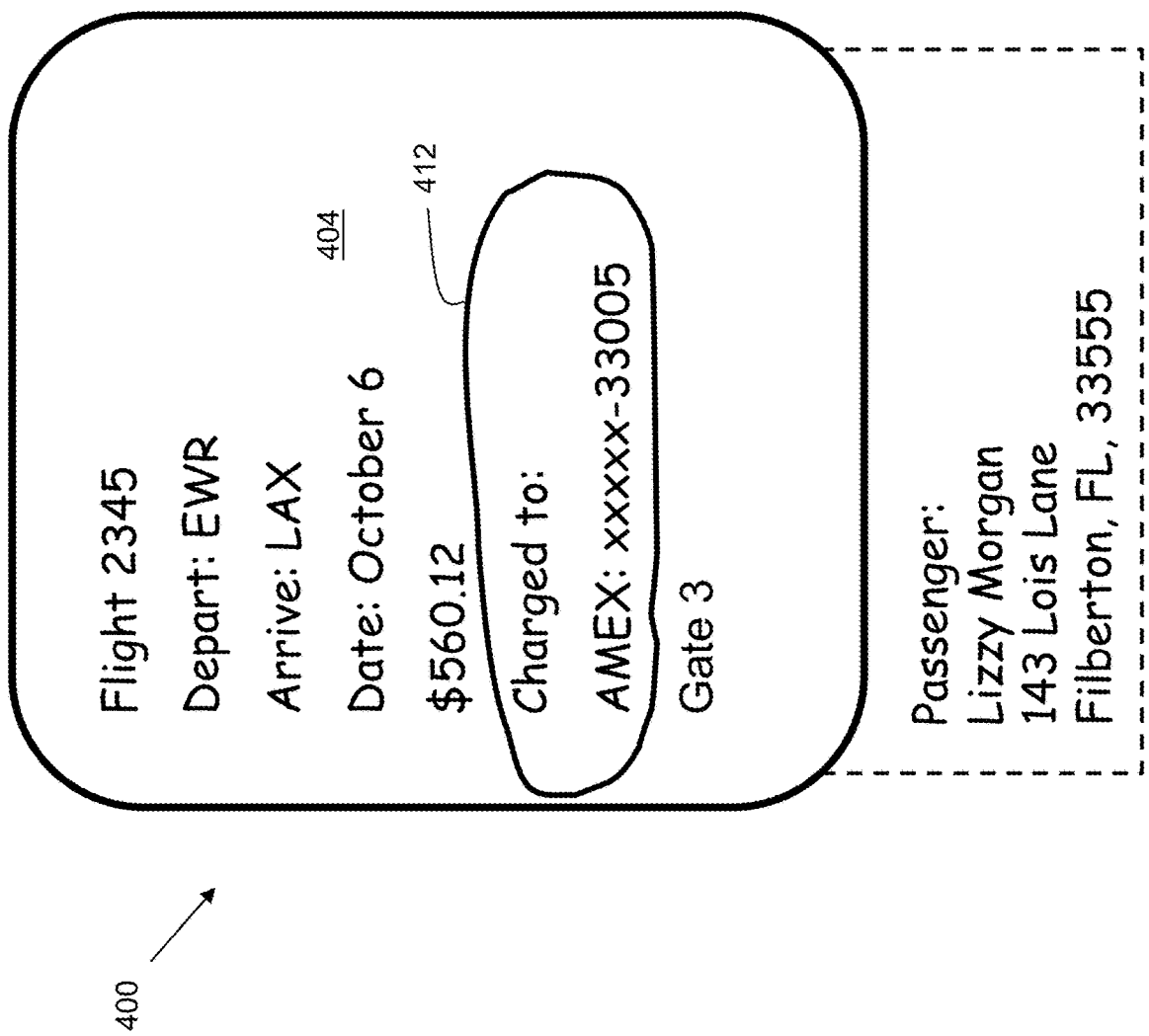
FIG. 6B shows a first identified region of unallowable content.

FIG. 6B shows a first received region of unallowable content. In some embodiments, receiving a selection of one or more regions of allowable content on a display of the electronic device includes receiving a selection of a first region of allowable content on the display of the electronic device. In the example, a user has dragged his/her finger, or other device, on the screen 404 to define enclosed region 412.

Figure 6C:
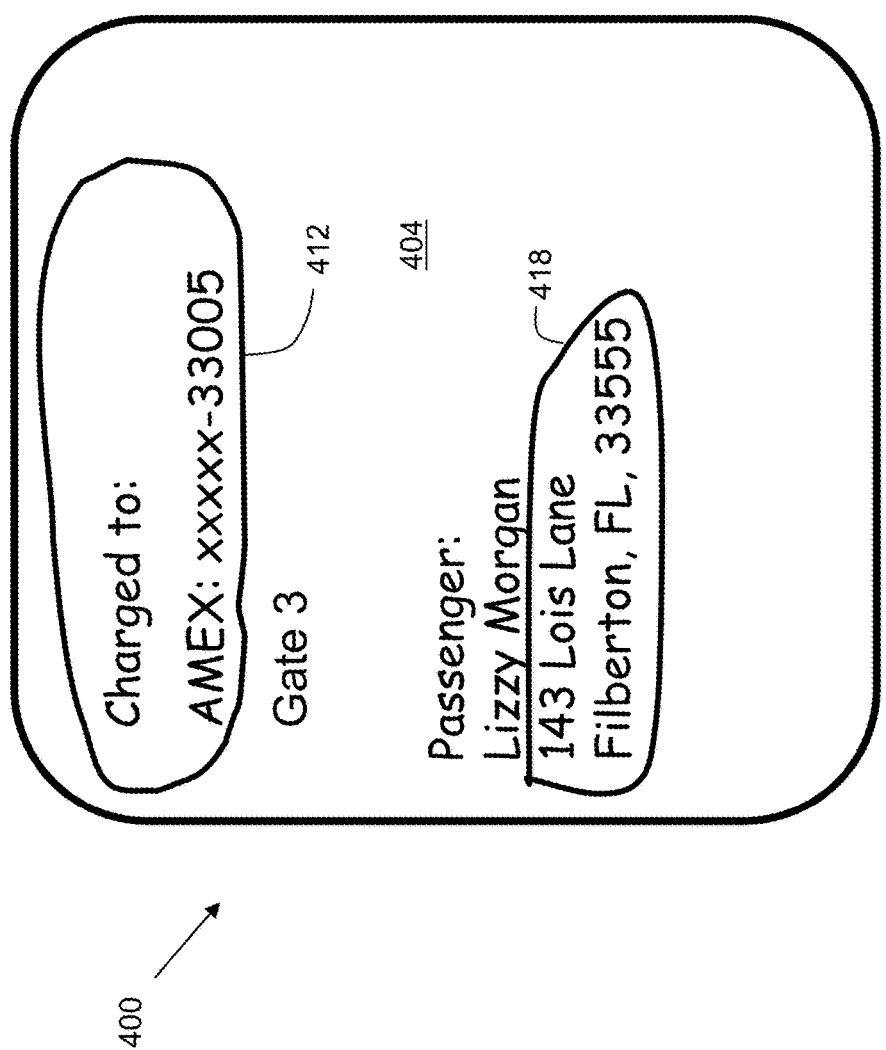
FIG. 6C shows a second identified region of unallowable content.

FIG. 6C shows a second received region of unallowable content. In embodiments, a selection of one or more regions of allowable content on a display of the electronic device further includes receiving a selection of a second region of allowable content on the display of the electronic device. In the example, the user has dragged his/her finger, or other device, on the screen 404 to define enclosed region 418, after he/she had defined enclosed region 412. The enclosed regions can be used to define allowable content and/or unallowable content, depending on the embodiment and/or mode of operation.

Figure 6D:
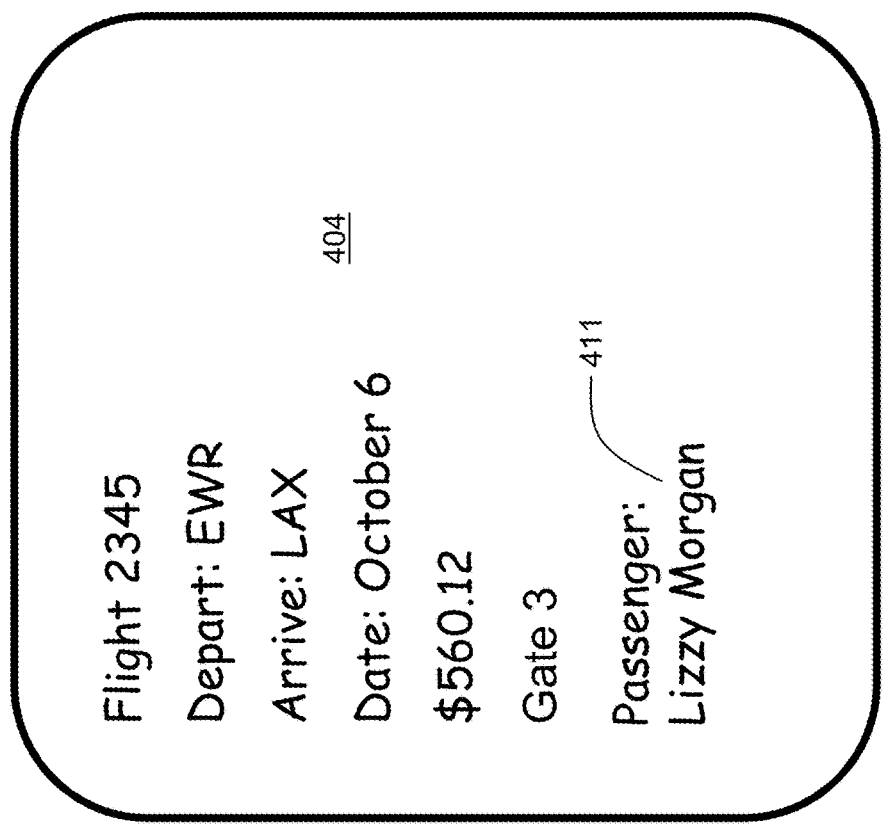
FIG. 6D shows a display in temporary privacy mode with a collapsed obfuscated area.

In some embodiments, the first region and the second region are separated by a distance greater than the length of the display of the electronic device. In embodiments, obfuscating an area of the display that is outside of the one or more regions of allowable content includes collapsing the obfuscated area, such that the first region and second region are displayed simultaneously while the electronic device is in the temporary privacy mode. The user can scroll down in order to define region 418 after he/she defines region 412. When the selected areas are obfuscated, the obfuscated area is collapsed, which in the example, results in passenger name 411 moved upward toward the other remaining displayed content, such that it is all now displayed in the screen 404, as shown in FIG. 6D.

As can now be appreciated, disclosed embodiments enable a user to conveniently and easily protect sensitive content on a mobile device while temporarily giving control of the mobile device to a third party. In this way, the temporary privacy mode enables sensitive content to be better protected, reducing the risk of identity theft and improving protection of user privacy.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. An electronic device comprising:
   a processor;
   a user-facing camera;
   a memory coupled to the processor, the memory containing instructions, that when executed by the processor, cause the processor to:
   receive a selection of a first region of allowable content on the display of the electronic device;
   receive a selection of a second region of allowable content on the display of the electronic device, wherein the first region and the second region are separated by a distance greater than a length of the display of the electronic device such that the first region and the second region are not simultaneously displayed on the display;
   receive a selection from a set of options to disable notifications published to the display of the electronic device for one or more types of received messages upon entry into a temporary privacy mode;
   receive a request to enter the temporary privacy mode;
   obfuscate an area of the display that is outside of the first region or the second region upon receiving the request to enter the temporary privacy mode, wherein the obfuscating includes collapsing the obfuscated area, such that the second region is moved towards the first region such that the first region and the second region of allowable content are displayed simultaneously while the electronic device is in the temporary privacy mode;
   suppress publication of a notification of a message received at the electronic device to the display of the electronic device while in the temporary privacy mode in the case that the received message corresponds to the selected message type;
   detect a user's face in a camera field of view from the user-facing camera;
   detect a direction of stare of the user;
   process a request to exit the temporary privacy mode upon detecting the direction of stare of the user; and
   deobfuscate the area of the display that was previously obfuscated.

2. The electronic device of claim 1, wherein receiving a selection of one or more regions of allowable content comprises receiving one or more enclosed regions of allowable content.

3. The electronic device of claim 2, wherein receiving a selection of one or more regions of allowable content comprises tracking a closed shaped path from user input of a touch screen on the electronic device.

4. The electronic device of claim 1, wherein receiving a selection of one or more regions of allowable content comprises:
   receiving one or more enclosed regions of unallowable content; and
   computing one or more regions of allowable content by excluding the one or more enclosed regions of unallowable content from the display.

5. The electronic device of claim 1, wherein obfuscating an area of the display that is outside of the one or more regions of allowable content comprises whiting out the area, blacking out the area, or blurring the area.

6. The electronic device of claim 1, wherein receiving a request to enter a temporary privacy mode comprises: detecting a security gesture, or receiving alphanumeric user input on the touch screen.

7. The electronic device of claim 1, the selection from a set of options further comprising configuring the electronic device to send a call from a selected phone number directly to voicemail in the case that a call is received from the selected phone number while in the temporary privacy mode.

8. A computer program product for obfuscating displayed content on an electronic computing device, the computer program product comprising a computer readable hardware storage device having program instructions embodied therewith, the program instructions executable by a processor to cause the electronic computing device to:
   receive a selection of a first region of allowable content on the display of the electronic device;
   receive a selection of a second region of allowable content on the display of the electronic device, wherein the first region and the second region are separated by a distance greater than a length of the display of the electronic device such that the first region and the second region are not simultaneously displayed on the display;
   receive a selection from a set of options to disable notifications published to the display of the electronic device for one or more types of received messages upon entry into a temporary privacy mode;
   receive a request to enter the temporary privacy mode;
   obfuscate an area of the display that is outside of the first region or the second region upon receiving the request to enter the temporary privacy mode, wherein the obfuscating includes collapsing the obfuscated area, such that the second region is moved towards the first region such that the first region and the second region of allowable content are displayed simultaneously while the electronic device is in the temporary privacy mode;
   suppress publication of a notification of a message received at the electronic device to the display of the electronic device while in the temporary privacy mode in the case that the received message corresponds to the selected message type;
   receive a request to exit the temporary privacy mode;

detect a user's face in a camera field of view from a user-facing camera of the electronic computing device;

detect a direction of stare of the user;

process the request to exit the temporary privacy mode upon detecting the direction of stare of the user; and deobfuscate the area of the display that was previously obfuscated.

9. The computer program product of claim 8, wherein receiving a selection of one or more regions of allowable content comprises receiving one or more enclosed regions of allowable content.

10. The computer program product of claim 9, wherein receiving a selection of one or more regions of allowable content comprises tracking a closed shaped path from user input of a touch screen on the electronic device.

11. The computer program product of claim 8, wherein receiving a selection of one or more regions of allowable content comprises:

receive one or more enclosed regions of unallowable content; and compute one or more regions of allowable content by excluding the one or more enclosed regions of unallowable content from the display.

12. The computer program product of claim 8, wherein obfuscating an area of the display that is outside of the one or more regions of allowable content comprises whiting out the area, blacking out the area, or blurring the area.

13. The computer program product of claim 8, wherein receiving a request to enter a temporary privacy mode comprises: detecting a security gesture, or receiving alphanumeric user input on the touch screen.

14. The computer program product of claim 8, wherein the computer readable storage medium further comprises program instructions executable by a processor to cause the electronic computing device to: configure the electronic device to send a call from a selected phone number directly to voicemail in the case that a call is received from the selected phone number while in the temporary privacy mode.

* * * * *